United States Patent [19]

Nadalin et al.

[11] Patent Number: 4,496,445
[45] Date of Patent: Jan. 29, 1985

[54] SEPARATION OF ISOTOPES OF ZIRCONIUM

[75] Inventors: Robert J. Nadalin, Penn Hills Township, Allegheny County; Robert G. Charles, Allison Park, both of Pa.

[73] Assignee: Westinghouse Electric Corp., Pittsburgh, Pa.

[21] Appl. No.: 415,095

[22] Filed: Sep. 7, 1982

[51] Int. Cl.³ .............................................. B01D 59/00
[52] U.S. Cl. ...................................... 204/158 R; 75/84
[58] Field of Search .................... 204/157.1 R, 158 R; 75/84

[56] References Cited

U.S. PATENT DOCUMENTS

| 3,443,087 | 5/1969 | Robieux et al. |
| 3,937,956 | 2/1976 | Lyon |
| 3,941,670 | 3/1976 | Pratt |
| 4,020,350 | 4/1977 | Ducas |
| 4,024,217 | 5/1977 | Wexler et al. |
| 4,025,790 | 5/1977 | Jetter et al. |
| 4,096,046 | 6/1978 | Niemann |
| 4,097,384 | 6/1978 | Coleman et al. ............. 204/157.1 R |
| 4,166,951 | 9/1979 | Garbuny |
| 4,389,292 | 6/1983 | Phillips et al. ................. 204/158 R |

OTHER PUBLICATIONS

Miller et al., "Infrared Photochemistry of a Volatile Uranium Compound . . . ", ©1979, Amer. Chem. Soc., pp. 1036, 1037.
Dewitt, "A Survey of Large-Scale Isotope Applications", Mound Lab.—U.S. Gov't Contract EY-76-C-0-4-0053, 1977.

Primary Examiner—Deborah L. Kyle
Attorney, Agent, or Firm—D. E. Erickson

[57] ABSTRACT

Selected isotopes of zirconium are separated by irradiating vapor of material consisting of hydrolysis-resistant compounds dicyclopentadienyl zirconium dichloride, dicyclopentadienyl zirconium di-isopropoxide and/or dicyclopentadienyl zirconium di-tert-butoxide with a laser beam tuned to vibration of an excitable band of the component of the compounds including the selected isotope. The component of the material including the excited band is separated from the remainder of the material. Parts for a nuclear reactor are made of zirconium derived from the separated material or from the remainder, whichever has the lower neutron-absorption cross section.

5 Claims, 6 Drawing Figures

SEPARATION OF ISOTOPES OF ZIRCONIUM

REFERENCE TO RELATED APPLICATION

This application relates to an application Ser. No. 411,221 filed Aug. 25, 1982 to John D. Feichtner, et al. for *Separation of Isotopes of Zirconium* and assigned to Westinghouse Electric Corporation (herein Feichtner). Feichtner is incorporated in this application by reference.

BACKGROUND OF THE INVENTION

This invention relates to the nuclear reactor art and to the art of separating isotopes. It has particular relationship to the separation of isotopes of zirconium for the purpose of improving the efficiency of nuclear reactors by reducing the absorption of neutrons by parts of nuclear reactors such as cladding, thimble tubes, grids, pressure tubes, fuel plates, cladding liners and the like. Feichtner discloses that the neutron absorption cross section of nuclear reactor parts composed of zirconium may be improved by forming the parts of zirconium substantially enriched in a low neutron-absorption isotope, such as $^{90}Zr$, or of zirconium depleted in a high neutron-absorption isotope, such as $^{91}Zr$. The enrichment or depletion is achieved by selectively irradiating vapor of material formed of a compound or compounds of zirconium with a laser beam tuned to the vibration frequency of a chemical bond of the component of the material including the selected isotope, which is here designated as $^sZr$, or of a bond linked directly or indirectly to $^sZr$. Zirconium compounds suitable for processing with a laser beam must have a number of properties which adapt them to this processing. The compounds must be capable of being rendered volatile within a moderately elevated temperature range. Typically this temperature range is between 100° C. and 200° C. Within this temperature range the compounds must have substantial vapor pressure, also the compounds must not be susceptible to thermal decomposition. In particular the compounds must not be decomposed at a temperature below the upper limit of the temperature range at which they are volatilized. The compounds must not be susceptible to hydrolysis. Hydrolyzed compounds are not volatile and are usually present in a form, for example particulated, in which they are not suitable for processing so as to enrich them or deplete them in an isotope. The difficulty and cost of preparation of the compounds is also an important consideration. An indispensible requirement is that the compounds must have accessible chemical bonds whose vibrations are within the frequency range of lasers operating at emitting rates and intensities at which appreciable quantities of selected isotopes are produced. Typically these lasers are of the carbon dioxide type which operate in the infrared range at about 1000 $cm^{-1}$ wave number. For more complex bonds at lower frequencies a Raman-shifted carbon dioxide laser operating between 450 and 700 $cm^{-1}$ wave number may be used.

Feichtner discloses separation of the isotopes of zirconium using the alkoxide compounds, zirconium tetra tertiary butoxide, zirconium tetra tertiary amyloxides and zirconium tetra isopropoxide. These compounds are highly satisfactory, but they are subject to hydrolysis. In using these compounds provision must be made to prevent the penetration of moisture into the chambers in which these compounds are volatilized and excited.

It is an object of this invention to overcome this disadvantage of the process taught by Feichtner and to provide a method of separating isotopes in whose practice compounds, which meet the above stated requirements and in particular are not appreciably subject to hydrolysis, shall be used.

SUMMARY OF THE INVENTION

This invention arises from the realization that zirconium cyclopentadienyl derivatives as a class more closely meet the above requirements for laser isotope separation than do other compounds proposed in accordance with the teachings of the prior art. In particular some of these cyclopentadienyl derivatives are not appreciably subject to hydrolysis. The described substances fall into two general groups, monocyclopentadienyl (formula I below) and dicyclopentadienyl (formula II below) zirconium compounds.

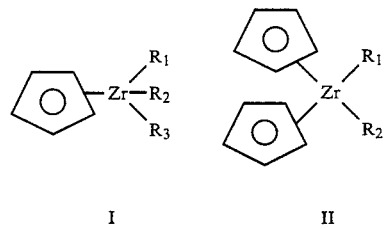

I          II

The pentagons with the enclosed circles may be referred to as the cyclopentadienyl groups or radicals and may be written:

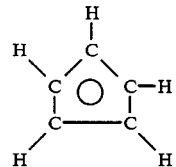

The circle designates $\pi$ bonding; i.e., the electrons involved are associated with all carbons instead of each being localized with a separate carbon atom. The cyclopentadienyl group is often written Cp.

In compounds I and II the cyclopentadienyl groups are linked to the zirconium by $\pi$-bonding, rather than to any individual carbon atoms. $R_1$, $R_2$, and $R_3$ can be any of a wide variety of substituents, including: —F, —Cl, —Br, —I, —$OR_4$ (where $R_4$ is an alkyl or aryl group) and the ester grouping:

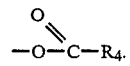

The groups $R_1$, $R_2$, and $R_3$ can be identical within a given molecule or, at least, in principal, present in any combination.

Further possibilities for molecular modification with accompanying changes in the physical properties, are provided by substitution in the aromatic cyclopentadienyl rings, as indicated in formula III:

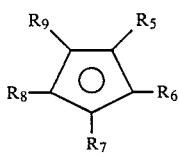

where R$_5$–R$_9$ can be the same or can differ in a given molecule. R$_5$–R$_9$ can be any of the groups described above for compounds I and II plus such substituents as —H, —COOH, —OH, alkyl, ester groupings, —NO$_2$, etc. (in general, any group which can function as a substituent in other aromatic ring systems).

The compounds defined by formulas I and II are described in the following literature.

(1) P. C. Wailes, R. S. P. Coutts and H. Weigold, "Organometallic Chemistry of Titanium, Zirconium and Hafnium", Chapter IV, Academic Press, New York (1974).

(2) D. R. Gray and C. H. Brubaker, Jr., Inorg. Chem. 10, 2143 (1971).

(3) P. M. Druce et al, J. Chem. Soc. (London) A, 1969, 2106.

Only a small fraction of the above defined zirconium compounds have actually been prepared and described in the scientific literature cited above. Most of the others, however, seem capable of existence and could probably be prepared with sufficient effort by modifications of existing synthetic techniques. To a considerable extent, it should be possible to adjust, or "fine tune", a given physical property (such as the wavelengths of infrared absorption) by incorporation of suitable substituents. Trade-offs are obviously involved, since other physical properties will be changed simultaneously often in unpredictable and sometimes deleterious ways.

Quantitative values for many of the physical properties of the compounds I and II, above, are, for the most part, lacking. But these substances are reasonably volatile, as is clear from the fact that published syntheses often employ sublimation, under reduced pressure, as a final purification step.

Of the many compounds defined by formulas I, II and III dicyclopentadienyl zirconium dichloride, (Cp)$_2$ZrCl$_2$; dicyclopentadienyl zirconium di-isopropoxide,

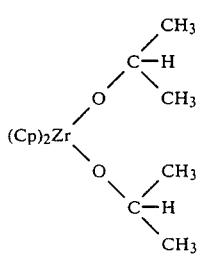

and dicyclopentadienyl zirconium di-tert-butoxide,

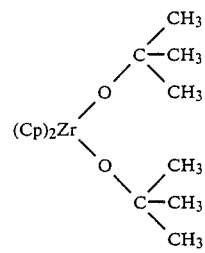

have been found particularly suitable for isotope separation. The dicyclopentadienyl zirconium dichloride is herein sometimes referred to as DZD, the dicyclopentadienyl zirconium di-isopropoxide, DZDI and the dicyclopentadienyl zirconium di-tert-butoxide DZDB. These compounds are volatile without being dissociated within the utilized temperature range and they resist hydrolysis in the presence of atmospheric moisture. They also have suitable infrared absorption bands to which a carbon dioxide laser can be tuned. All the above compounds are solid, at room temperature. The DZD is available from Alfa-Ventron, Danvers, MA or Aldrich Chemical Co., Milwaukee, WI. DZDI and DZDB can be prepared readily as disclosed in the literature listed above. Typically the DZD serves as a starting material for preparation of the DZDI or the DZDB. DZDI is conveniently prepared by modification of the method described by Gray and Brubaker (supra). The relative amount of triethylamine used in the preparation described by Gray and Brubaker, whose purpose is to drive the reaction towards the desired product through the formation of amine hydrochloride, as a by-product, is increased in the current preparation so as to increase the yield and purity of the product. For further purification the compound is recrystallized from hexane, supplemented by being vacuum sublimed. These changes from Gray and Brubaker resulted in improved ease of preparation and greatly increased yield. Purity, with respect to possible undesirable by-products, typically Cl and isopropyl containing materials, is also improved.

BRIEF DESCRIPTION OF THE DRAWINGS

For a better understanding of this invention, both as to its organization and as to its practice, together with additional objects and advantages thereof, reference is made to the following description taken in connection with the accompanying drawings, in which.

DETAILED DESCRIPTION OF INVENTION

Figure 1:
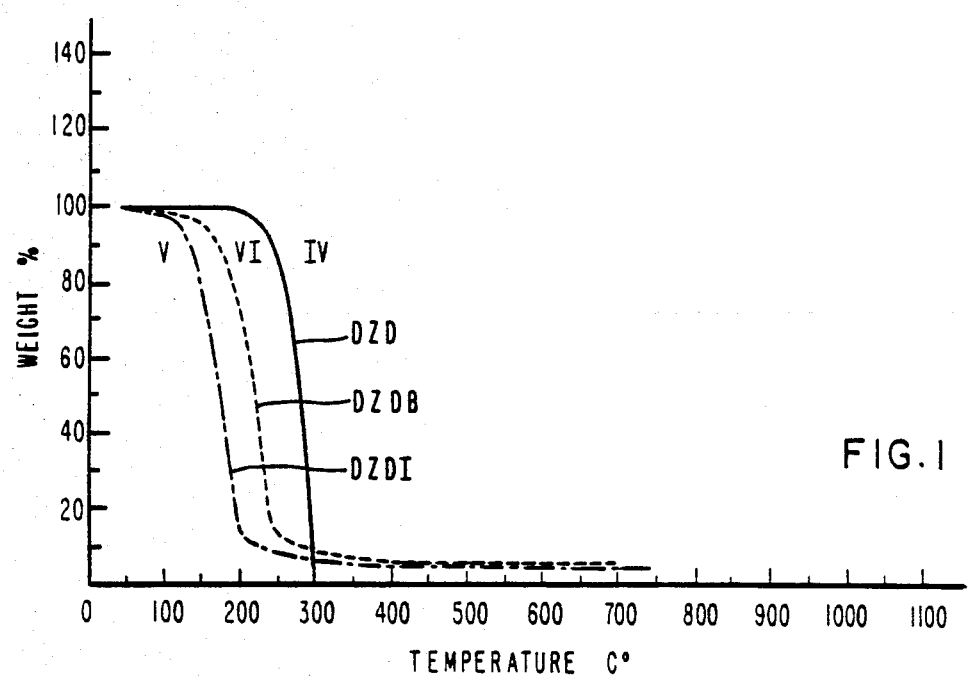
FIG. 1 is a graph showing the results of thermogravimetric analysis (TGA) runs for DZD, DZDI and DZDB carried out to (a) establish the relative volatility of these compounds, (b) the absence of thermal decomposition; and (c) the absence of impurities having different volatility characteristics from those of the above compounds.

The curves shown in FIG. 1 result from subjecting each of the compounds, DZD, DZDI and DZDB to temperature increasing at the rate of 10C° per minute in an atmosphere of flowing nitrogen at atmospheric pressure. The method of analysis is discussed in W. W. Wendlandt, *Thermal Method of Analysis*, Interscience, New York 1964. A weighed portion of each compound in the form of a powder was transferred to a thermobalance mounted in a chamber. The chamber was flushed with nitrogen and then the temperature within the chamber was raised as the nitrogen continued to flow. Changes in weight were automatically recorded as a function of temperature.

As the temperature was raised each of the compounds was sublimated.

In FIG. 1 weight remaining after each increase in temperature is plotted vertically and the temperature in C° horizontally. Full line curve IV is for DZD, dash-dot curve V for DZDI and broken-line curve VI for DZDB. It was found that in each case the weight loss which occurs, as the temperature is raised linearly with time, is caused almost entirely by vaporization of the parent compound and not by decomposition. Serious thermal decomposition would result in a substantial zirconium-containing non-volatile residue. Only small residues were observed. The absence of inflections in the vaporization curves (FIG. 1) shows the absence of volatile impurities. The relative order of decreasing volatility, as determined by the positions of the more vertical portions of the TGA curves along the abscissa, is $V > VI > IV$. The curves show a rapidly increasing rate of sublimation as the temperature is raised. This results from the strong dependence of vapor pressure with temperature of these compounds. Sublimation of the DCD is completed at about 300° C., with most of the volatilization taking place between 250° C. and 300° C. The small amount of residue remaining in the case of the other two compounds (about 5%) may represent a minor degree of thermal decomposition accompanying sublimation or may result from the initial presence of small amounts of non-volatile impurities. The DZDI is sublimed at a maximum rate between about 110° and 200° C. and the DZDB between about 200° and 250° C. At suitable fixed temperatures within or below these ranges, each of the compounds can be sublimed to produce vapor to be irradiated by a laser beam. While this practice is preferred, it is within the scope of equivalents of the invention to use a mixture of the compounds DZD, DZDI and DZDB or any two of them and to heat them gradually between temperatures of 110° C. and 300° C. at a rate determined by the quantity of each compound in the mixture to vaporize, irradiate and process each compound in its turn; first the DZDI, next the DZDB and last the DZD. In this case the irradiating laser must be tuned to accommmodate each compound in its turn.

An advantage of the processing of a mixture is that it may be more economical to use a raw reaction mixture containing more than one cyclopentadienyl derivative than to isolate individual compounds.

Figure 2:
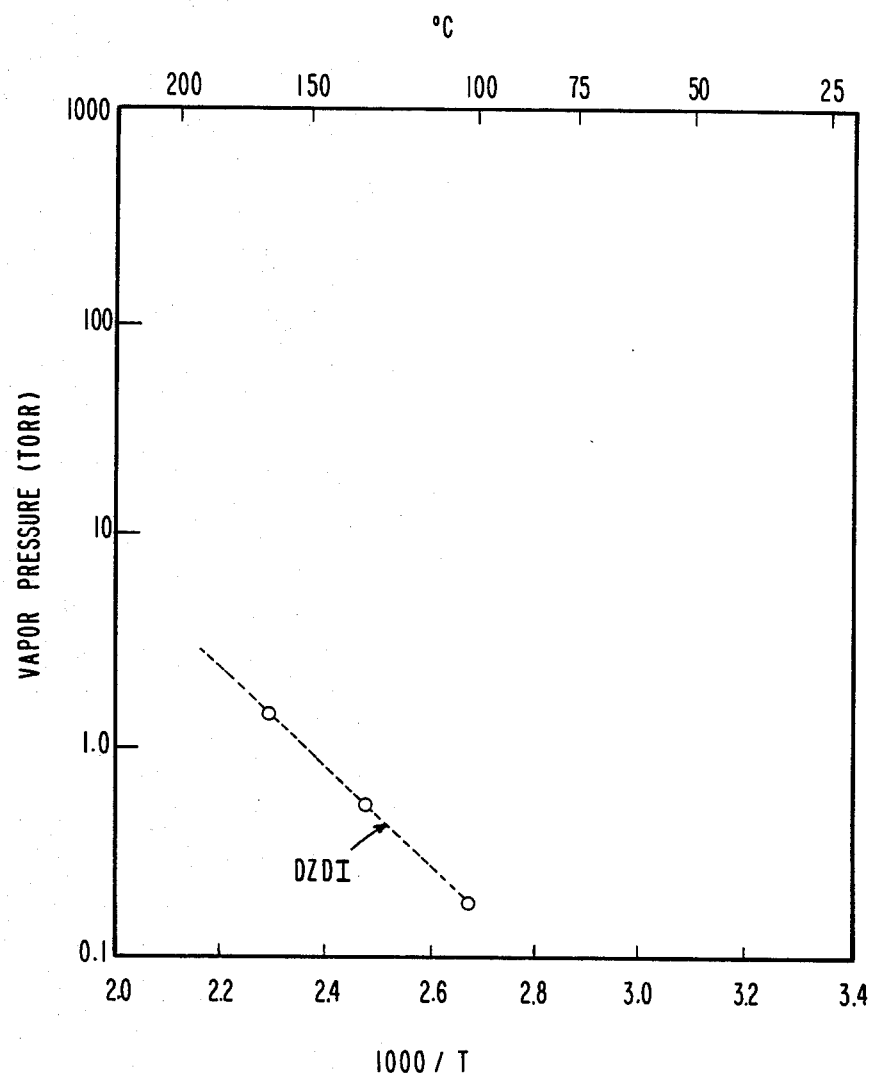
FIG. 2 is a graph showing how the quantitatively determined vapor pressure of DZDI varies with temperature.

Since TGA runs give only relative volatility data, quantitative vapor pressure measurements have been carried out for the compound DZDI using the transpiration method as described by G. W. Thomson (*Determination of Vapor Pressure*) in "Techniques of Organic Chemistry" Vol. I, A. Weissberger, Editor, Interscience, New York, 1965). Results are plotted as a function of temperature in FIG. 2. In FIG. 2 vapor pressure in Torr is plotted vertically and (1000/T); where T is the absolute temperature, is plotted horizontally. Temperatures in C° corresponding to the (1000/T) abscissa plots are shown horizontally across the top. The vapor pressure, ordinate scale, is logarithmic. The vapor pressure of DZDI is substantially smaller at the corresponding temperatures than the vapor pressure of zirconium tetra-tert-butoxide or zirconium tetra-tert amyloxide which are processed as disclosed in Feichtner. The resistance to hydrolysis by adventitious moisture is considerably greater for DZD, DZDI and DZDB than for the tetra alkoxides of Feitchtner. This advantage may be of overriding importance in practice. Also DZD, DZDI and DZDB possess superior thermal stability at the temperatures of interest.

Figure 3A:
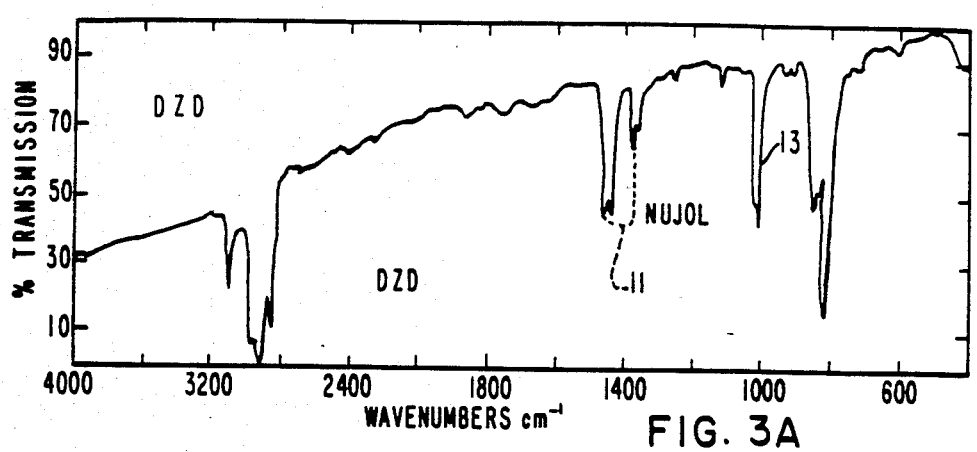
FIGS. 3A, 3B, 3C, show the infrared absorption spectra for DZD, DZDI, and DZDB respectively.
Figure 3B:
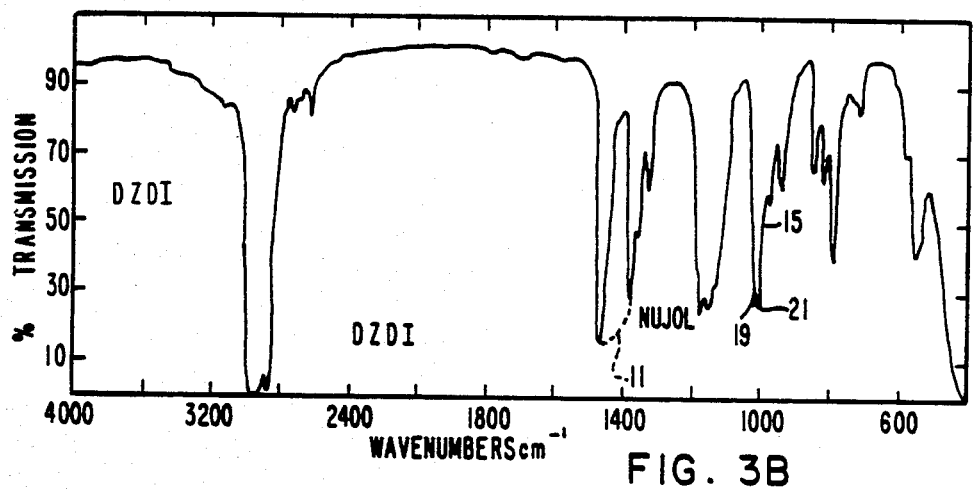
Figure 3C:
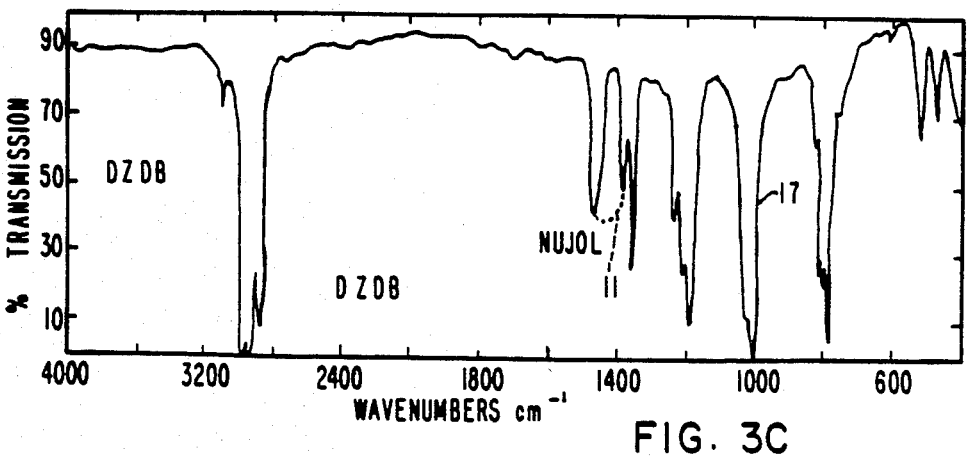

For producing FIGS. 3A, 3B, 3C infrared light in the frequency range between 400 $cm^{-1}$ and 4000 $cm^{-1}$ wave number was transmitted through powders of DZD, DZDI, and DZDB dispersed in a mull of Nujol. The upper graph FIG. 3A, presents the absorption curve for DZD, the center graph, FIG. 3B, for DZDI and the lower graph, FIG. 3C, for DZDB. In each graph the percent of light transmitted is plotted vertically. The wave numbers are plotted horizontally in each graph.

The absorption bands for the Nujol are indicated by broken lines 11 extending between the peaks of these bands. Each curve has absorption bands 13, 15, 17 at about 1000 $cm^{-1}$ wave numbers. These bands derive from the vibrational modes of the cyclopentadienyl rings (Cp) in the compounds (see Wailes et al). The band 15 for DZDI clearly shows two peaks 19 and 21. The other bands 13 and 17 also have peaks which would be resolved if the bands were expanded. The bands 13, 15, 17 are suitable for the absorption of carbon dioxide laser radiation which may be tuned to the optimum frequency for the dissociation of the molecules which contain the selected zirconium isotope. The excitation of the cyclopentadienyl ring indirectly effects the separation of the selected zirconium isotope.

Additional laser-energy absorption in the region of 1000 $cm^{-1}$ wave numbers could be effected by the introduction of suitable substituents into the molecular structure of the cyclopentadienyl metal-organic compounds (at $R_1$, $R_2$ or $R_3$ in I or II, or at $R_5$–$R_9$ in III). Absorption by such substituents may be more efficacious than that due to the cyclopentadienyl groups in promoting zirconium isotope separation by laser excitation. In particular, cyclopentadienyl zirconium alkoxides also have infrared absorption bands in this general wavelength region which are associated with Zr-O-C vibrations.

Figure 4:
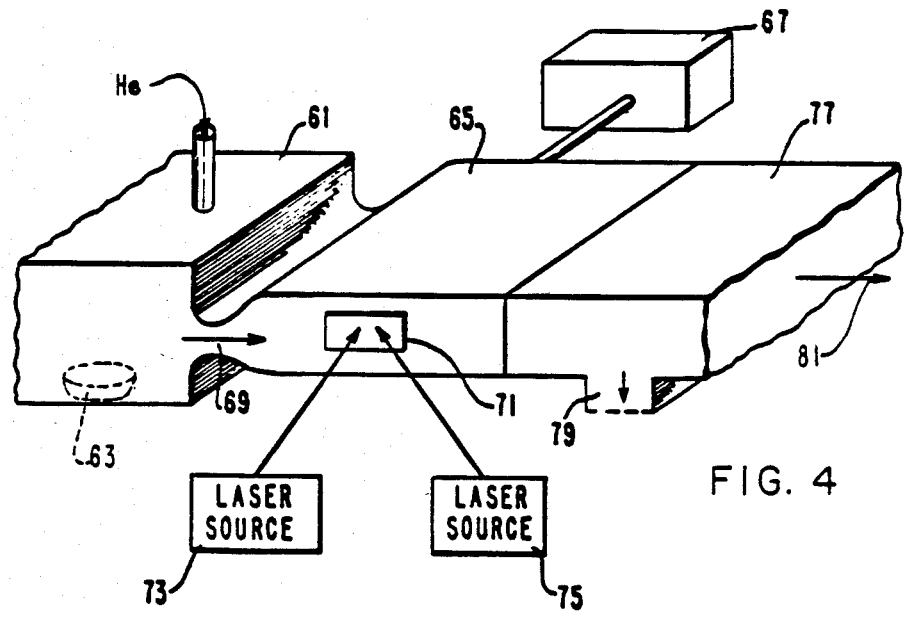
FIG. 4 is a diagrammatic view of apparatus for practicing this invention.

The apparatus shown in FIG. 4 is similar to like apparatus in Feichtner. The apparatus includes a chamber 61 within which there is a vessel 63 including the compounds DZD, DZDI and DZDB alone or in any combination in powdered form. A heater (not shown) is provided for the vessel 63 or the chamber 61 may be heated. The vapor from the material in vessel 63 is swept into reaction chamber 65 by continuously flowing inert or non-reactive gas such as helium or nitrogen. The reaction chamber is maintained evacuated by pump 67. The vapor and gas pass through nozzle 69 and expand adiabatically into the reaction chamber. The expansion reduces the temperature of the vapor limiting the population in higher quantum states. The reaction chamber has a window 71 transparent to infrared light. Infrared light from a laser source 73 is transmitted through the window and irradiates the vapor which is passing through the reaction chamber in a stream. The laser source 73 is typically a $CO_2$ laser operable in the range between 900 and 1100 cm$^{-1}$ wave numbers. The laser is tuned to the vibration of the zirconium cyclopentadienyl bonds of the zirconium isotope selected for separation. Typically it has been found that a laser tuned to wave numbers of 940 to 980 cm$^{-1}$ or from 1035 to 1055 cm$^{-1}$ will decompose the DZDI molecule. The vapor may also be irradiated by an additional laser source or sources 75 which emit radiation of a different frequency than the source 73. The sources 75 may emit infrared or ultra-violet radiation or both. The function of the sources 75 is described in Feichtner. The processed vapor passes into separation chamber 77. The excited component which may condense as a solid or liquid passes out through channel 79. The unexcited vapor does not condense and passes out through channel 81. If the material derived from channel 79 is enriched in a zirconium isotope, for example $^{90}$Zr, having a low neutron-absorption cross section, the zirconium from this material is used to fabricate nuclear-reactor parts. If the material derived from channel 81 is depleted in zirconium, for example $^{91}$Zr, having a high neutron-absorption cross section, the parts are fabricated from the zirconium derived from this channel.

While preferred practice of this invention has been disclosed herein, many modifications thereof are feasible. This invention is not to be restricted except insofar as is necessitated by the spirit of the prior art.

We claim:

1. The method of producing zirconium having a low neutron-absorption cross section for use in parts of a nuclear reactor the said method comprising producing a material comprising one or more compounds selected from the group consisting of dicyclopentadienyl zirconium dichloride, $(Cp)_2ZrCl_2$, dicyclopentadienyl zirconium di-isopropoxide

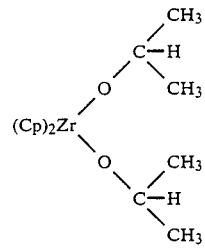

and dicyclopentadienyl zirconium di-tert-butoxide,

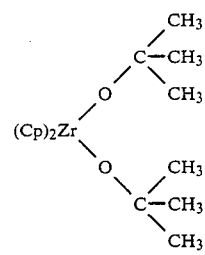

which are hydrolysis resistant, said material containing a plurality of isotopes of zirconium, subjecting the vapor of said material to radiation emitted from a carbon dioxide laser tuned to the vibration of an excitable bond directly or indirectly associated with a selected $^s$Zr isotope of said material, whereby the $^s$Zr component of said material is decomposed, separating the product of the decomposition of the $^s$Zr component from the remainder of said irradiated material, and forming the said parts of that one of the separated $^s$Zr component of said material or of the remainder of said material in which the zirconium has the minimum neutron-absorption cross section.

2. The method of claim 1 wherein the material is a solid at room temperature and the vapor which is subjected to laser irradiation is produced by increasing the temperature of the material gradually from 110° C. to 300° C. at a rate such that each of the components of the material is in its turn vaporized.

3. The method of claim 1 wherein the material is only dicyclopentadienyl zirconium dichloride and the vapor is produced by heating the material to a temperature of between 250° C. and 300° C.

4. The method of claim 1 wherein the material is only dicyclopentadienyl zirconium di-isopropoxide and the vapor is produced by heating the material to a temperature of between 110° C. and 200° C.

5. The method of claim 1 wherein the material is only dicyclopentadienyl zirconium di-tert-butoxide and the vapor is produced by heating the material to a temperature of between 200° C. and 250° C.

* * * * *